(12) United States Patent
Yamamoto

(10) Patent No.: US 7,531,928 B2
(45) Date of Patent: May 12, 2009

(54) SPINDLE MOTOR AND ROTATION DEVICE HAVING DYNAMIC PRESSURE BEARING

(75) Inventor: Takeyoshi Yamamoto, Ehime (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 495 days.

(21) Appl. No.: 11/477,546

(22) Filed: Jun. 30, 2006

(65) Prior Publication Data
US 2007/0085432 A1    Apr. 19, 2007

(30) Foreign Application Priority Data
Oct. 14, 2005  (JP) ............... 2005-300032

(51) Int. Cl.
H02K 5/16 (2006.01)
H02K 7/08 (2006.01)
F16C 17/10 (2006.01)
G11B 17/02 (2006.01)

(52) U.S. Cl. .................. 310/90; 310/67 R; 360/99.07; 360/99.08; 384/112

(58) Field of Classification Search .............. 310/67 R, 310/90; 360/98.07, 99.07–99.08; 384/100, 384/107–124
See application file for complete search history.

(56) References Cited

U.S. PATENT DOCUMENTS 7,092,203 B2* 8/2006 Inoue et al. ............. 360/98.07
7,133,250 B2* 11/2006 Herndon et al. .......... 360/99.08
7,391,139 B2* 6/2008 Yamamoto ................ 310/90
2003/0234589 A1* 12/2003 Parsoneault et al. ........ 310/90
2004/0091187 A1* 5/2004 Aiello et al. .............. 384/112
2006/0158052 A1* 7/2006 Yamamoto ................ 310/90

FOREIGN PATENT DOCUMENTS

JP  2000-283154  10/2000
JP  2004-135419  4/2004

* cited by examiner

Primary Examiner—Tran N Nguyen
(74) Attorney, Agent, or Firm—Bacon & Thomas, PLLC

(57) ABSTRACT

A spindle motor includes a shaft including a core spindle member with a large and a small diameter portions and an encircling annulus member attached to the small diameter portion; a rotor hub attached to the large diameter portion; a bearing member; a radial bearing portion provided with first dynamic pressure creating grooves and formed between the outer peripheral surface of the encircling annulus member and the inner peripheral surface of the bearing member; a thrust bearing portion provided with second dynamic pressure creating grooves and formed between a lower end of the encircling annulus member and the bottom of the bearing member; a first opening formed at a radially inner side of the thrust bearing portion; a second opening formed at a radially outer side of the large diameter portion; and a communication hole continuously formed from the first opening to the second opening.

16 Claims, 3 Drawing Sheets

SPINDLE MOTOR AND ROTATION DEVICE HAVING DYNAMIC PRESSURE BEARING

FIELD OF THE INVENTION

The present invention relates to a spindle motor and a rotation device that make use of a hydrodynamic bearing.

BACKGROUND OF THE INVENTION

As a bearing device for use in spindle motors of hard disks, polygon mirrors, optical disk devices or the like, a hydrodynamic bearing is being extensively used in place of a conventionally available ball bearing. As compared to the ball bearing, the hydrodynamic bearing is excellent in rotational precision and silentness. The demand for miniaturization and high rigidity of the spindle motors grows stronger because their use has been expanded to portable equipments in recent years.

Japanese Patent Laid-open Publication No. 2000-283154 ("prior art reference 1") discloses a small-sized and high rigidity spindle motor arrangement wherein, as shown in FIG. 4, encircling annulus member 2 having radial dynamic pressure creating grooves 10 on its outer peripheral surface is attached to the outer peripheral surface of core spindle member 1 so that the outer peripheral surface of encircling annulus member 2 can cooperate with the inner peripheral surface of sleeve 3 to form a radial bearing. Furthermore, encircling annulus member 2 is provided with thrust dynamic pressure creating grooves 11 on its upper and lower surfaces such that thrust bearings are formed between the lower surface of encircling annulus member 2 and the bottom surface of sleeve 3 and further between the upper surface of encircling annulus member 2 and the underside of cover member 4. Lubricant that serves as working fluid is filled in those parts including at least the radial bearing and the thrust bearings, namely, between the outer peripheral surface of encircling annulus member 2 and the inner peripheral surface of sleeve 3, between the lower surface of encircling annulus member 2 and the bottom surface of sleeve 3, and between the upper surface of encircling annulus member 2 and the underside of cover member 4. This configuration makes it possible to increase the diameter of the radial bearing and hence to achieve improvement in the rigidity of the radial bearing. Additionally, communication hole 12 for allowing the lubricant to flow therethrough is formed between core spindle member 1 and encircling annulus member 2 and further inside encircling annulus member 2. Communication hole 12 acts to compensate the pressure differential which may occur between the top and bottom ends of the radial bearing and further between the inner and outer edges of the thrust bearings due to the cutting errors of the dynamic pressure creating grooves formed in the portions of the radial bearing and the thrust bearings or the cutting errors of the respective components or other factors. Such compensation of the pressure differential helps to suppress bubble generation and excessive rotor floating which would otherwise take place by the negative pressure in the lubricant.

Japanese Patent Laid-open Publication No. 2004-135419 ("prior art reference 2") teaches a spindle motor arrangement wherein, as illustrated in FIG. 5, encircling annulus member 2 having radial dynamic pressure creating grooves 10 on its outer peripheral surface is attached to the outer peripheral surface of core spindle member 1 so that the outer peripheral surface of encircling annulus member 2 can cooperate with the inner peripheral surface of sleeve 3 to form a radial bearing. Furthermore, sleeve 3 is provided with thrust dynamic pressure creating grooves 11 on its top surface such that a thrust bearing is formed between the top surface of sleeve 3 and the underside of rotor hub 5. Lubricant that serves as working fluid is filled in those spatial parts including at least the radial bearing and the thrust bearings, namely, between the outer peripheral surface of encircling annulus member 2 and the inner peripheral surface of sleeve 3 and between the top surface of sleeve 3 and the underside of rotor hub 5. This configuration makes it possible to increase the diameter of the radial bearing and hence to achieve improvement in the rigidity of the radial bearing. Additionally, communication hole 12 for allowing the lubricant to flow therethrough is formed between the outer peripheral surface of core spindle member 1 and the inner peripheral surface of encircling annulus member 2. Communication hole 12 acts to compensate the pressure differential which may occur in the lubricant retained at the axial top and bottom end portions between the outer peripheral surface of encircling annulus member 2 and the inner peripheral surface of sleeve 3 due to the cutting errors of the dynamic pressure creating grooves formed in the portions of the radial bearing or the cutting errors of the respective components or other factors. Such compensation of the pressure differential helps to suppress bubble generation and excessive rotor floating which would otherwise take place by the negative pressure in the lubricant.

The spindle motor arrangements disclosed in prior art references 1 and 2 however suffer reduction in the diameter of core spindle member 1, which problem stems from the structure that encircling annulus member 2 is attached to the outer peripheral surface of core spindle member 1. This may weaken the coupling force between rotor hub 5 and core spindle member 1, thus reducing the rigidity of the spindle motor as a whole.

With the spindle motor arrangement taught in prior art reference 1, communication hole 12 formed between core spindle member 1 and encircling annulus member 2 is elongated rectilinearly toward bearing openings. Thus, if bubbles are generated by increased dimensional errors or external disturbances such as a shock and the like, the bubbles tend to move up at an accelerated speed as they are discharged to the outside through communication hole 12. This leads to an increased possibility that the lubricant is leaked together in the bubble discharging process.

According to the spindle motor arrangement proposed in prior art reference 2, no communication hole is formed in the portions of the thrust bearing. This means that no means is available to compensate the pressure differential occurring between the inner and outer peripheral surfaces of the thrust bearing due to the cutting errors of thrust dynamic pressure creating grooves 11 and the respective components or other factors. Accordingly, it is impossible to suppress bubble generation and excessive rotor floating caused by the negative pressure in the lubricant. Furthermore, in the event of bubbles being generated by increased dimensional errors or external disturbances such as a shock and the like, the bubbles are blocked off by the dynamic pressure of the thrust bearing and therefore cannot be discharged to the outside. This is because the communication hole has its openings at the radial inner side of the thrust bearing. In addition, due to the fact that the thrust dynamic pressure creating grooves 11 are formed on the top surface of sleeve 3 whose area is quite small, difficulties may be encountered in forming a shoulder portion of desired profile on the top surface of sleeve 3 and in cutting thrust dynamic pressure creating grooves 11 with an enhanced degree of precision. For the same reason, thrust dynamic pressure creating grooves 11 cannot be formed in a cost-effective manner, e.g., through the use of a press-forming method and so forth, thus making it difficult to curtail the manufacturing costs.

SUMMARY OF THE INVENTION

It is, therefore, an object of the present invention to provide a spindle motor that can improve the rigidity of the motor as a whole by increasing the coupling force between a rotor hub and a core spindle member and further that can prevent any leakage of lubricant by properly forming communication hole for discharging bubbles and for compensating a pressure differential caused by the cutting errors of dynamic pressure creating grooves and neighboring components or other factors In accordance with the present invention, there is provided a spindle motor including: a shaft including a core spindle member with a large diameter portion and a small diameter portion and an encircling annulus member attached to the small diameter portion; a rotor hub attached to an outer peripheral surface of the large diameter portion; a bearing member including a removal inhibiting member and a bottom surface, wherein the bearing member is provided with a bearing bore closed at one end and opened at another end and having an inner peripheral surface radially confronting with an outer peripheral surface of the encircling annulus member; fluid filled in a gap between the shaft and the bearing member; a radial bearing portion formed between the outer peripheral surface of the encircling annulus member and the inner peripheral surface of the bearing member, wherein first dynamic pressure creating grooves are formed on at least one thereof; a thrust bearing portion formed between a lower end surface of the encircling annulus member and the bottom surface of the bearing member, wherein second dynamic pressure creating grooves are formed on at least one thereof; a first opening formed at a radially inner side of the thrust bearing portion and opened in an axial direction; a second opening formed at a radially outer side of the large diameter portion in the vicinity of the removal inhibiting member and opened radially outwardly; and a communication hole continuously formed from the first opening to the second opening.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENTS

Preferred embodiments of a spindle motor and a rotation device in accordance with the present invention will now be described with reference to the accompanying drawings.

First Preferred Embodiment

Figure 1:
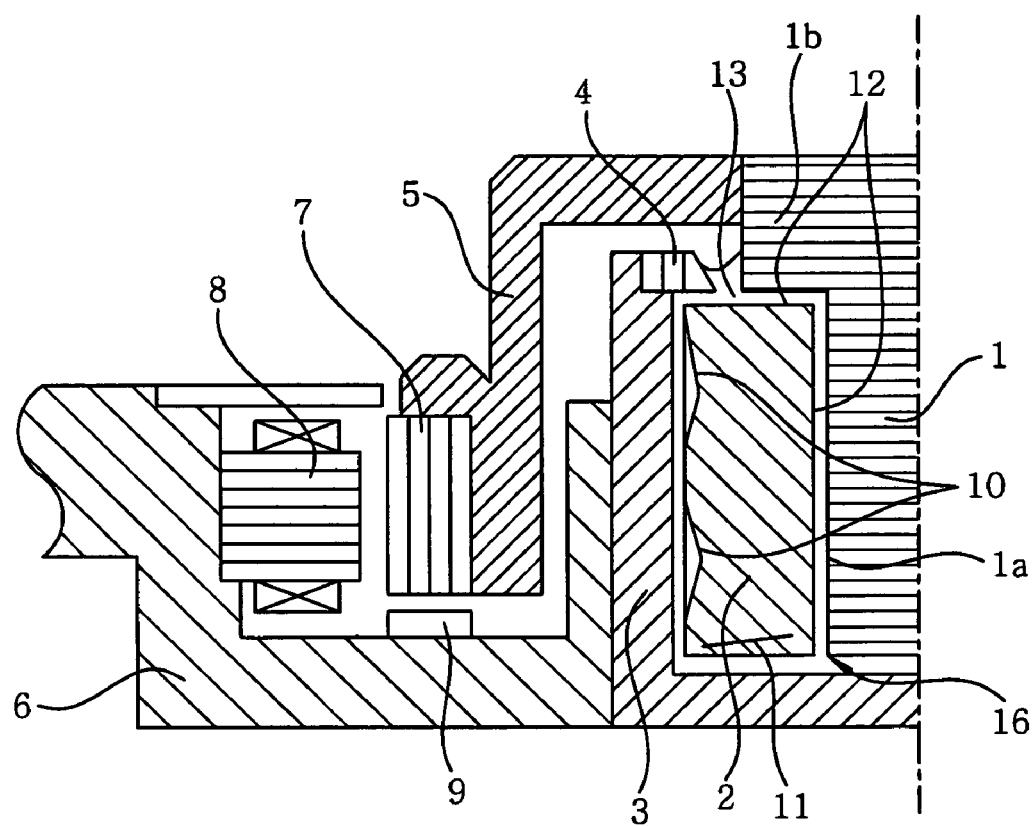
FIG. 1 is a cross sectional view of a spindle motor in accordance with a first preferred embodiment of the present invention.

FIG. 1 is a cross sectional view of a spindle motor in accordance with a first preferred embodiment of the present invention. The spindle motor includes core spindle member 1 stepped in such a manner as to have two different diameters. Rotor hub 5 is attached to large diameter portion 1b of core spindle member 1, thereby forming a rotor rotatable about an axis of core spindle member 1. Encircling annulus member 2 is attached to lower small diameter portion 1a of core spindle member 1, thus constituting shaft member 16. Encircling annulus member 2 is greater in diameter than large diameter portion 1b of core spindle member 1. Thus shaft member 16 is of a flanged shape. Use of stepped core spindle member 1 makes it possible to couple rotor hub 5 to large diameter portion 1b. This increases the contact area between core spindle member 1 and rotor hub 5, thereby achieving improvement in the coupling strength. In other words, the increase in diameter of the press-fit portion where core spindle member 1 and rotor hub 5 are press-fitted together leads to the increase in contact surface area (surface area) of the press-fit portion. In an effort to enhance the degree of precision in assembly, it would also be possible to bring the upper surface of encircling annulus member 2 into contact with the underside of large diameter portion 1b of core spindle member 1.

Sleeve 3 opened at one end and closed at another end facing said one end constitutes a bearing member which in turn is provided with an inner peripheral surface facing the outer peripheral surface of encircling annulus member 2. Sleeve 3 is disposed around the outer peripheral surface of encircling annulus member 2 with a small gap therebetween. This allows the rotor, comprised of core spindle member 1 and encircling annulus member 2, to rotate with respect to sleeve 3. Sleeve 3 is secured to base 6, thus forming a stator in cooperation with the latter.

Annular magnet 7 is attached to and extends around the lower outer peripheral surface of rotor hub 5. Stator core 8 is fixed to base 6 in a confronting relationship with magnet 7. If a controlled amount of electric current is caused to flow through a coil of stator core 8, a rotational force is generated between stator core 8 and magnet 7 to thereby rotate the rotor relative to the stator.

Lubricant that serves as working fluid is filled in between the outer peripheral surface of encircling annulus member 2 and the inner peripheral surface of sleeve 3. Radial dynamic pressure creating grooves 10 are formed on at least one of the outer peripheral surface of encircling annulus member 2 and the inner peripheral surface of sleeve 3. Rotation of encircling annulus member 2 creates a dynamic pressure between the outer peripheral surface of encircling annulus member 2 and the inner peripheral surface of sleeve 3, thus forming a radial bearing. By means of the radial bearing, encircling annulus member 2 is supported on sleeve 3 in a radially non-contacted condition.

Lubricant that serves as working fluid is also filled in between the lower end surface of encircling annulus member 2 and the bottom surface of sleeve 3. Thrust dynamic pressure creating grooves 11 are formed on at least one of the lower surface of encircling annulus member 2 and the bottom surface of sleeve 3. Rotation of encircling annulus member 2 creates a dynamic pressure between the lower surface of encircling annulus member 2 and the bottom surface of sleeve 3, thus forming a thrust bearing. By means of the thrust bearing, encircling annulus member 2 is supported on sleeve 3 in an axially non-contacted condition.

Attractor ring 9, made of a magnetic material, is attached to base 6 such that an attracting force is created between magnet 7 and attractor ring 9 to counterbalance the dynamic pressure of the thrust bearing, thereby allowing the rotor to be stably supported in an axial direction. Alternatively, such a magnetic biasing action may be induced by causing the axial magnetic center of magnet 7 to deviate from that of stator core 8.

Cover member 4 is attached to the top portion of sleeve 3. The inner diameter of cover member 4 is smaller than the outer diameter of encircling annulus member 2, i.e., the diameter of the flange portion of shaft member 16. This ensures that, at the time when the rotor is urged to be separated from the bearing member, the upper surface of encircling annulus member 2 makes contact with the underside of cover member 4 thus inhibiting removal of the rotor.

Cover member 4 has a tapering inner peripheral surface which is flared upwardly outwardly with respect to core spindle member 1. The tapering inner peripheral surface of cover member 4 cooperates with the outer peripheral surface of core spindle member 1 to form a seal portion that prevents any leakage of the lubricant. The seal portion takes advantage of a capillary force. The same sealing effect as noted just above may be attained by forming the inner peripheral surface of cover member 4 into a stepped shape (not shown).

In this regard, communication hole 12 is provided between lower small diameter portion 1a of core spindle member 1 and the inner peripheral surface of encircling annulus member 2 and further between the underside of large diameter portion 1b of core spindle member 1 and the upper surface of encircling annulus member 2. Communication hole 12 is provided with a first opening formed on the radial inner side of the thrust bearing and a second opening formed on the upper surface of encircling annulus member 2, i.e., the upper surface of the flange of shaft member 16, in the vicinity of cover member 4. The first opening at the thrust bearing side is opened in an axial direction at the radial inner side of the thrust bearing, while the second opening at the cover member side is radially outwardly opened at the radial outer side of large diameter portion 1b of core spindle member 1.

Communication hole 12 allows the top end and bottom end (including the thrust bearing portion) of the radial bearing to communicate with each other and therefore can compensate the pressure differential occurring in the radial bearing. Communication hole 12 can also compensate the pressure differential occurring in the thrust bearing, because the outer end (including the radial bearing portion) of the thrust bearing is kept in communication with the inner end thereof.

Communication hole 12 remains curved and angled in conformity with the first and second openings of the communication hole 12 respectively opened in an axial direction and a radial direction. This helps to reduce the rising speed of bubbles in the event that the bubbles are generated and discharged to the outside though communication hole 12. Accordingly, it is possible to preclude the possibility that the lubricant is leaked together in the bubble discharging process.

Neither thrust bearing nor radial bearing exists between the opening of the bearing and the second opening of communication hole 12. Thus, the bubbles are not blocked off by the dynamic pressure of the thrust bearing or the radial bearing but can be smoothly discharged to the outside.

Communication hole 12 can be readily formed between the outer peripheral surface of lower small diameter portion 1a of core spindle member 1 and the inner peripheral surface of encircling annulus member 2 by forming an axial groove on at least one of the outer peripheral surface of lower small diameter portion 1a of core spindle member 1 and the inner peripheral surface of encircling annulus member 2. Further, communication hole 12 can be formed on the upper surface side of encircling annulus member 2 by a method of attaching encircling annulus member 2 to core spindle member 1 with a gap left between the underside of large diameter portion 1b of core spindle member 1 and the upper surface of encircling annulus member 2 or a method of forming a radial groove on at least one of the underside of large diameter portion 1b of core spindle member 1 and the upper end surface of encircling annulus member 2 or other methods.

Although the shaft member is of a two-part structure having core spindle member 1 and encircling annulus member 2, it may be composed of a single component, in which case communication hole 12 can be formed by machining, laser cutting, electrolysis or the like. Furthermore, encircling annulus member 2 may be divided into two parts, in which case it becomes possible to form the openings of communication hole 12 somewhere along the radial bearing or between the thrust bearing and the radial bearing.

If encircling annulus member 2 is made of a porous body or a resin material, it becomes possible to form thrust dynamic pressure creating grooves 11 and radial dynamic pressure creating grooves 10 by a cost-effective method such as press-forming or the like, thus achieving reduction in the manufacturing costs. Thank to the fact that the thrust dynamic pressure creating grooves 11 are not formed on sleeve 3 as in the prior art but on encircling annulus member 2, it is possible to simultaneously form thrust dynamic pressure creating grooves 11 and radial dynamic pressure creating grooves 10, which further reduces the manufacturing costs.

The spindle motor is typically used in the environments with a broad spectrum of temperature. Thus, the bearing gap is changed by the temperature variation in the case that encircling annulus member 2 and sleeve 3 have different linear expansion coefficients. The bearing gap should be minimized as far as possible in order to maintain the precision degree of components. But, it is necessary to maintain the precision degree of components with minimum bearing gap. The variation in the bearing gap can be reduced by equalizing the linear expansion coefficients of encircling annulus member 2 and sleeve 3. In the case that encircling annulus member 2 is made of a porous body or a resin material, it is better to form sleeve 3 with the porous body or the resin material. Instead, sleeve 3 may also be formed with brass or other like metal which has substantially the same linear expansion coefficient as that of the porous body or the resin material.

The viscosity of the lubricant varies with the temperature, which means that the bearing rigidity and the bearing torque loss are changed depending on the temperature variation. As a solution to this problem, it is known that the lubricant viscosity variation can be eliminated by narrowing the bearing gap at a high temperature and broadening the bearing gap at a low temperature. Accordingly, if encircling annulus member 2 is made of a material whose linear expansion coefficient is greater than that of the material for sleeve 3, it becomes possible to narrow the bearing gap at a high temperature and to broaden the bearing gap at a low temperature, which in turn makes it possible to suppress any temperature-dependent variation in the bearing rigidity and the bearing torque loss.

Figure 2A:
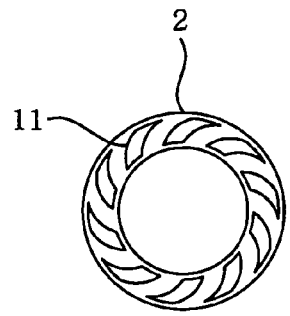
FIGS. 2A through 2D are enlarged cross sectional views showing thrust dynamic pressure creating grooves and radial dynamic pressure creating grooves employed in the present invention.
Figure 2C:
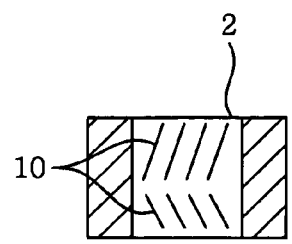
Figure 2B:
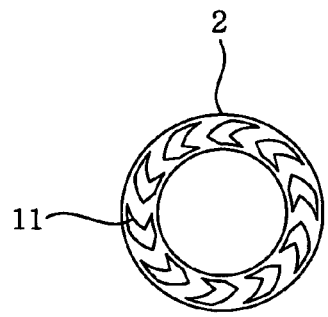
Figure 2D:
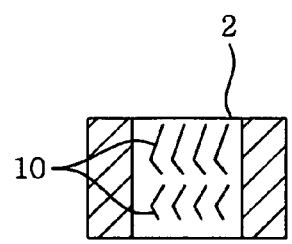

FIGS. 2A through 2D illustrate shapes of thrust dynamic pressure creating grooves 11 and radial dynamic pressure creating grooves 10. Thrust dynamic pressure creating grooves 11 are of a pump-in shape capable of, when the rotor is in rotation, inducing a pressure gradient under which the lubricant is urged to flow radially inwardly. Examples of thrust dynamic pressure creating grooves 11 include spiral grooves as illustrated in FIG. 2A and herringbone grooves of an unbalanced shape each having an inner groove part and an outer groove part longer than the inner groove part, as depicted in FIG. 2B. Radial dynamic pressure creating grooves 10 are also of a pump-in shape capable of, when the rotor is in rotation, inducing a pressure gradient under which the lubricant is urged to flow axially downwardly toward the bottom surface of sleeve 3. Examples of radial dynamic pressure creating grooves 10 include generally unbalanced apex removed chevron-shaped grooves each having an axial lower wing and an axial upper wing longer than the axial lower wing, as illustrated in FIG. 2C, and herringbone grooves as depicted in FIG. 2D. This configuration allows the lubricant to flow through the radial bearing, the thrust bearing and communication hole 12 in the sequence. Thus, once bubbles are generated somewhere in the bearings, they can be rapidly discharged to the outside through communication hole 12. Such flow of lubricant is induced as far as one of thrust dynamic pressure creating grooves 11 and radial dynamic pressure creating grooves 10 has the pump-in shape, although it is preferred that both should be formed in the pump-in shape as noted above. Furthermore, although two rows of herringbone grooves are illustrated in FIG. 2D, the herringbone grooves may be formed in one row or more than two rows. Moreover, unlike the example illustrated in FIG. 2D wherein the herringbone grooves in the upper row are of an unbalanced shape and the herringbone grooves in the lower row are generally symmetrical, it is a matter of course that the unbalanced shape may be adopted by the herringbone grooves in the lower row or the herringbone grooves in both rows.

Second Preferred Embodiment

Figure 3:
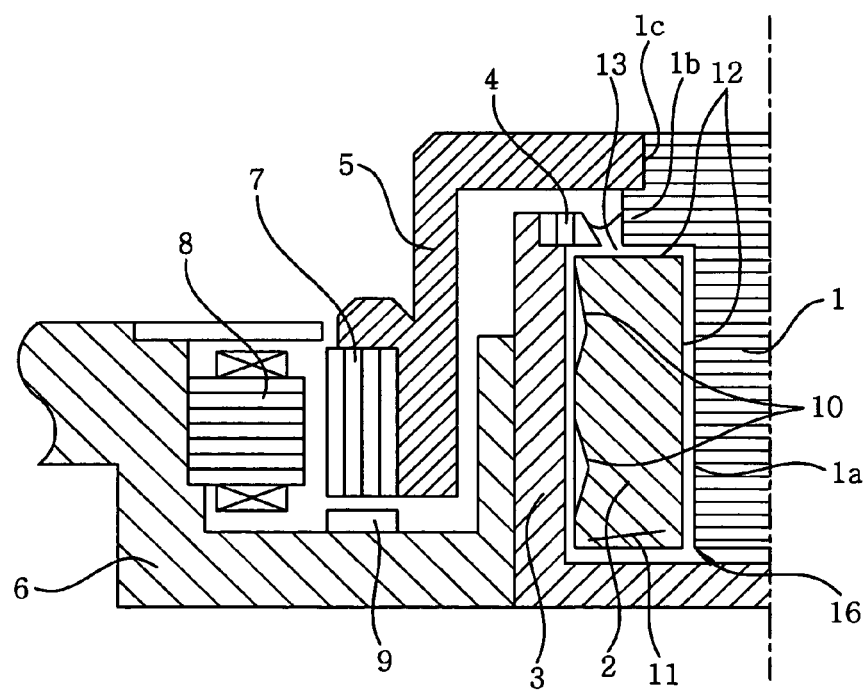
FIG. 3 is a cross sectional view of a spindle motor in accordance with a second preferred embodiment of the present invention.
Figure 4:
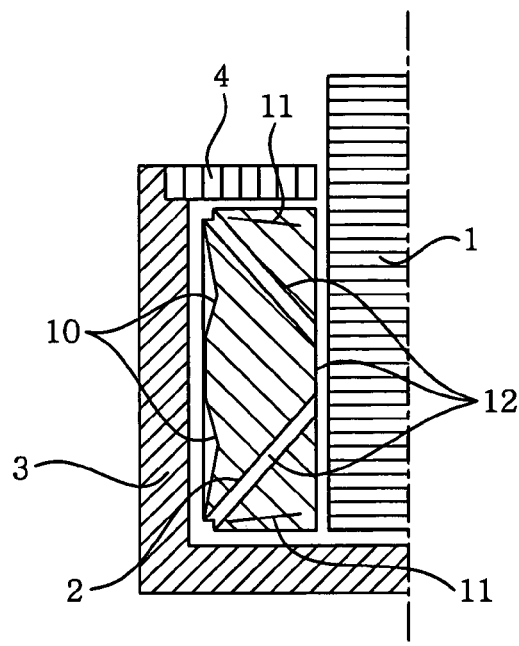
FIG. 4 is a cross sectional view showing a prior art spindle motor.
Figure 5:
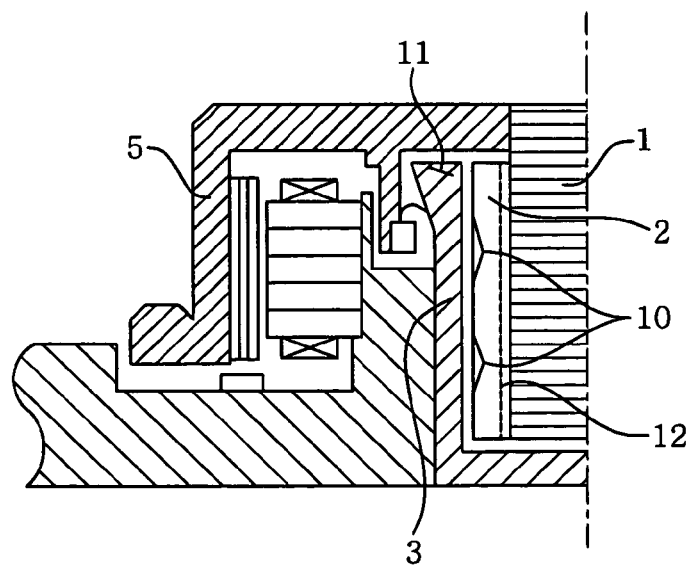
FIG. 5 is a cross sectional view illustrating another prior art spindle motor.

FIG. 3 is a cross sectional view of a spindle motor in accordance with a second preferred embodiment of the present invention. Contrary to the first preferred embodiment wherein the spindle motor is comprised of two-stepped core spindle member 1, core spindle member 1 employed in the spindle motor of the second preferred embodiment is further provided with upper small diameter portion 1c formed above large diameter portion 1b. Rotor hub 5 is attached to upper small diameter portion 1c in the second preferred embodiment. In this connection, rotor hub 5 and core spindle member 1 can be assembled together with an increased degree of precision by bringing the underside of rotor hub 5 into contact with the top surface of large diameter portion 1b of core spindle member 1 in the attachment process. Furthermore, core spindle member 1 and rotor hub 5 can be coupled together at a broadened contact area and hence with an increased coupling force by making the diameter of upper small diameter portion 1c greater than that of lower small diameter portion 1a of core spindle member 1.

Although the spindle motors of the first and second preferred embodiments are of an inner rotor type, they may adapt themselves to an outer rotor type.

The bearing device and the spindle motor employing the same in accordance with the present invention can be used a rotation device for hard disk drives, polygon mirrors, optical disk devices and so forth.

In accordance with the present invention noted above, the core spindle member has a stepped shape and the rotor hub is attached to the large diameter portion of the core spindle member, which makes it possible to increase the coupling force. Further, the radial inner side of the thrust bearing portion is in communication with the axial top side of the radial bearing portion through the communication hole. This makes it possible to compensate a pressure differential occurring in the radial bearing portion and the thrust bearing portion. Moreover, the communication hole is curved and angled such that the axial groove extends from the first opening to an underside of the large diameter portion and further that the radial groove extends radially inwardly from the second opening which is opened radially outwardly. This reduces the discharge speed of bubbles and thus precludes the possibility that the lubricant is leaked together with the bubbles.

What is claimed is:

1. A spindle motor comprising:
a shaft including a core spindle member with a large diameter portion and a small diameter portion and an encircling annulus member attached to the small diameter portion;
a rotor hub attached to an outer peripheral surface of the large diameter portion;
a bearing member including a removal inhibiting member and a bottom surface, wherein the bearing member is provided with a bearing bore closed at one end and opened at another end and having an inner peripheral surface radially confronting with an outer peripheral surface of the encircling annulus member;
fluid filled in a gap between the shaft and the bearing member;
a radial bearing portion formed between the outer peripheral surface of the encircling annulus member and the inner peripheral surface of the bearing member, wherein first dynamic pressure creating grooves are formed on at least one thereof;
a thrust bearing portion formed between a lower end surface of the encircling annulus member and the bottom surface of the bearing member, wherein second dynamic pressure creating grooves are formed on at least one thereof;
a first opening formed at a radially inner side of the thrust bearing portion and opened in an axial direction;
a second opening formed at a radially outer side of the large diameter portion in the vicinity of the removal inhibiting member and opened radially outwardly; and
a communication hole continuously formed from the first opening to the second opening.

2. The spindle motor of claim 1, wherein the large diameter portion has a first large diameter portion and a second large diameter portion, a diameter of the first large diameter portion being greater than that of the second large diameter portion, and the small and the second large diameter portion being formed at opposite sides of the first large diameter portion; and the rotor hub is attached to an outer peripheral surface of the second large diameter portion of the core spindle member.

3. The spindle motor of claim 2, wherein the small diameter portion and the second large diameter portion of the core spindle member differ in diameter from each other.

4. The spindle motor of claim 2, wherein the encircling annulus member is attached to the small diameter portion of the core spindle member such that an upper surface of the encircling annulus member makes contact with an underside of the large diameter portion of the core spindle member.

5. The spindle motor of claim 1, wherein the encircling annulus member has an outer diameter greater than a diameter of the large diameter portion of the core spindle member and the communication hole is formed between the encircling annulus member and the core spindle member.

6. The spindle motor of claim 5, wherein the communication hole is formed of an axial groove formed on at least one of an inner peripheral surface of the encircling annulus member and an outer peripheral surface of the core spindle member and a radial groove formed on at least one of an upper end surface of the encircling annulus member and an underside of the large diameter portion of the core spindle member.

7. The spindle motor of claim 1, wherein the encircling annulus member is made of a porous body or a resin material.

8. The spindle motor of claims 1, wherein the encircling annulus member has a linear expansion coefficient substantially equal to that of the bearing member.

9. The spindle motor of claim 1, wherein the encircling annulus member has a linear expansion coefficient greater than that of the bearing member.

10. The spindle motor of claim 1, wherein the second dynamic pressure creating grooves are of a pump-in shape capable of inducing a pressure gradient by which the fluid is urged to flow radially inwardly, and the first dynamic pressure creating grooves are of a pump-in shape capable of inducing a pressure gradient by which the fluid is urged to flow axially from an open end toward a closed end of the bearing member.

11. The spindle motor of claim 10, wherein the second dynamic pressure creating grooves are spiral grooves or herringbone grooves of an unbalanced shape.

12. The spindle motor of claim 10, wherein the first dynamic pressure creating grooves are grooves of unbalanced apex removed chevron shape or herringbone grooves of an unbalanced shape.

13. The spindle motor of claim 1, further comprising a rotor magnet attached to the rotor hub; a base to which the bearing member is attached; and a stator core attached to the base in a confronting relationship with the rotor magnet.

14. A rotation device comprising the spindle motor as recited in claim 1.

15. The rotation device of claim 14, further comprising a driven member attached to the core spindle member.

16. The rotation device of claim 15, wherein the driven member is a polygon mirror or a recoding disk.

* * * * *